US010289265B2

(12) United States Patent
Kulkarni

(10) Patent No.: US 10,289,265 B2
(45) Date of Patent: May 14, 2019

(54) CAPTURE AND RETRIEVAL OF A PERSONALIZED MOOD ICON

(71) Applicant: EXCALIBUR IP, LLC, New York, NY (US)

(72) Inventor: Harshad Abhay Kulkarni, Sunnyvale, CA (US)

(73) Assignee: EXCALIBUR IP, LLC, New York, NY (US)

( * ) Notice: Subject to any disclaimer, the term of this patent is extended or adjusted under 35 U.S.C. 154(b) by 143 days.

(21) Appl. No.: 13/967,393

(22) Filed: Aug. 15, 2013

(65) Prior Publication Data
US 2015/0052462 A1      Feb. 19, 2015

(51) Int. Cl.
G06F 3/0481    (2013.01)
G06F 16/58     (2019.01)
G06K 9/00      (2006.01)

(52) U.S. Cl.
CPC .......... *G06F 3/04817* (2013.01); *G06F 16/58* (2019.01); *G06F 2203/011* (2013.01); *G06K 9/00302* (2013.01)

(58) Field of Classification Search
CPC ............................... G06F 3/04817; G06F 8/34
USPC ........................................................ 715/765
See application file for complete search history.

(56) References Cited

U.S. PATENT DOCUMENTS

| | | | | |
|---|---|---|---|---|
| 2005/0223328 A1* | 10/2005 | Ashtekar | ............. | H04N 21/235 715/706 |
| 2006/0098027 A1* | 5/2006 | Rice | ..................... | H04M 1/576 345/619 |
| 2008/0162649 A1* | 7/2008 | Lee | ......................... | H04L 51/32 709/206 |
| 2009/0055484 A1* | 2/2009 | Vuong | ................. | G06Q 10/107 709/206 |
| 2010/0057875 A1* | 3/2010 | Bychkov | ................ | G06Q 50/24 709/206 |
| 2011/0296324 A1 | 12/2011 | Goossens et al. | | |
| 2012/0059787 A1 | 3/2012 | Brown et al. | | |
| 2012/0124483 A1* | 5/2012 | Zuckerberg | ............ | H04L 51/36 715/752 |
| 2012/0130717 A1 | 5/2012 | Xu et al. | | |

(Continued)

OTHER PUBLICATIONS

International Search Report (PCT/US2014/047785) dated Nov. 5, 2014; 3 pages.

*Primary Examiner* — Ryan F Pitaro
*Assistant Examiner* — Parmanand D Patel
(74) *Attorney, Agent, or Firm* — James J. DeCarlo; Greenberg Traurig, LLP

(57) ABSTRACT

Disclosed herein is system, method and apparatus to capture and retrieve personalized mood icons. A personalized mood icon may be used to express a mood, tone, emotion, etc., and may comprise one or more components, including without limitation one or more visual and/or audible components. An icon may be generated from a media item depicting a user and a mood of the user. For example, an icon may be generated from a media item comprising one or more of still image, video, audio, multimedia, etc. content. An icon may comprise content from one or more media items and/or content portions of one or more media items. An icon may comprise a textual component, such as for example a textual title or description of the mood, tone, motion being portrayed using the icon.

27 Claims, 14 Drawing Sheets

(56) References Cited

U.S. PATENT DOCUMENTS

| | | | |
|---|---|---|---|
| 2013/0147933 A1* | 6/2013 | Kulas | H04N 21/41407 348/61 |
| 2013/0154980 A1 | 6/2013 | Byrnes et al. | |
| 2014/0156762 A1* | 6/2014 | Yuen | H04L 51/32 709/206 |
| 2014/0157153 A1* | 6/2014 | Yuen | A63F 13/537 715/758 |
| 2014/0279418 A1* | 9/2014 | Rubinstein | G06Q 40/00 705/39 |

* cited by examiner

CAPTURE AND RETRIEVAL OF A PERSONALIZED MOOD ICON

FIELD OF THE DISCLOSURE

The present disclosure concerns a personalized mood expression, and more particularly to facilitating capture and retrieval of a personalized mood icon.

BACKGROUND

A computer user may express a mood, tone, emotion, etc., using a sequence of characters and/or cartoon-like stickers. Such an expression has been referred to as an emoticon, which is spawned from the words emotion and icon. The computer user might add an emoticon t-o a message, e.g., an instant message, to communicate a particular emotion or mood to the recipient of the message. By way of one example, to express a happy mood, the computer user might use the following character sequence: a colon followed by a hyphen followed by an open parenthesis, i.e. ":-)". The user might use a symbol to express a mood, e.g., a "smiley-face" symbol consisting of two dots positioned above an upward curve inside a circle, e.g., ☺, to express happiness. The computer user might use a cartoon-like sticker, e.g., a yellow-colored cartoonish smiley face to depict happiness.

SUMMARY

The conventional mechanisms for expressing mood, tone, emotion, etc., are limited. For example, the conventional mechanisms are not personalized for each user. The conventional approaches do not allow a user to use the user's own face and/or facial expression to express mood, tone, emotion, etc. Additionally, the conventional approaches do not provide an ability for a user to associate a personalized mood expression with a new and/or existing taxonomy, e.g., a mood taxonomy. Additionally, the conventional approaches do not provide an ability for a user to retrieve and use a personalized mood expression, e.g. include a personalized mood expression in a message, blog post, social media site post, etc.

The present disclosure seeks to address failings in the art and to provide a system, method and apparatus to capture and retrieve personalized mood icons. In accordance with one or more embodiments, a personalized mood icon may be used to express a mood, tone, emotion, etc., and may be comprised of one or more components, such as and without limitation one or more visual and/or audible components. In accordance with one or more embodiments, an icon may be generated from a media item depicting a user and a mood of the user. An icon may be generated from a media item comprising, for example, one or more of still image, video, audio, multimedia, etc. content. An icon may comprise content from one or more media items and/or content portions of one or more media items. An icon may comprise a textual component, such as and without limitation a textual title or description of the mood, tone, motion being portrayed using the icon.

In accordance with one or more embodiments, a method is provided, the method comprising identifying, via at least one computing device, a mood; obtaining, via the at least one computing device, a media item having content depicting an expression of a user; using, via the at least one computing device, at least a portion of the media item depicting the user's expression for a personalized mood icon for the user; and storing, via the at least one computing device, a relationship between the user and the personalized mood icon.

In accordance with one or more embodiments a system is provided, which system comprises at least one computing device comprising one or more processors to execute and memory to store instructions to identify a mood; obtain a media item having content depicting an expression of a user; use at least a portion of the media item depicting the user's expression for a personalized mood icon for the user; and store a relationship between the user and the personalized mood icon.

In accordance with yet another aspect of the disclosure, a computer readable non-transitory storage medium is provided, the medium for tangibly storing thereon computer readable instructions that when executed cause at least one processor to identify a mood; obtain a media item having content depicting an expression of a user, use at least a portion of the media item depicting the user's expression for a personalized mood icon for the user; and store a relationship between the user and the personalized mood icon.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a display including a personalized mood icon being used as a profile picture in accordance with one or more embodiments.

FIG. 2 provides an example of a personalized mood icon included in a user's text message in accordance with one or more embodiments of the present disclosure.

FIG. 3 illustrates some components for use in connection with one or more embodiments of the present disclosure.

FIG. 4 provides an example of a library mode display for use in accordance with one or more embodiments of the present disclosure.

FIG. 5 provides an example of a user interface that may be used to capture an image or video of the user that may be used in generating a personalized mood icon in accordance with one or more embodiments.

FIG. 6, which comprises FIGS. 6A and 6B, provides examples of outlines that may be used for winking in accordance with one or more embodiments.

FIGS. 7 and 8 provide examples using user input in an instant messaging application user interface in capturing and retrieval of a personalized mood icon in accordance with one or more embodiments of the present disclosure.

FIG. 9 provides another example of a media item capture user interface for use in accordance with one or more embodiments of the present disclosure.

FIG. 10 provides a process flow example in accordance with one or more embodiments of the present disclosure.

FIG. 11 provides an example of a personalized mood icon creation process flow in accordance with one or more embodiments of the present disclosure.

DETAILED DESCRIPTION

Figure 1:
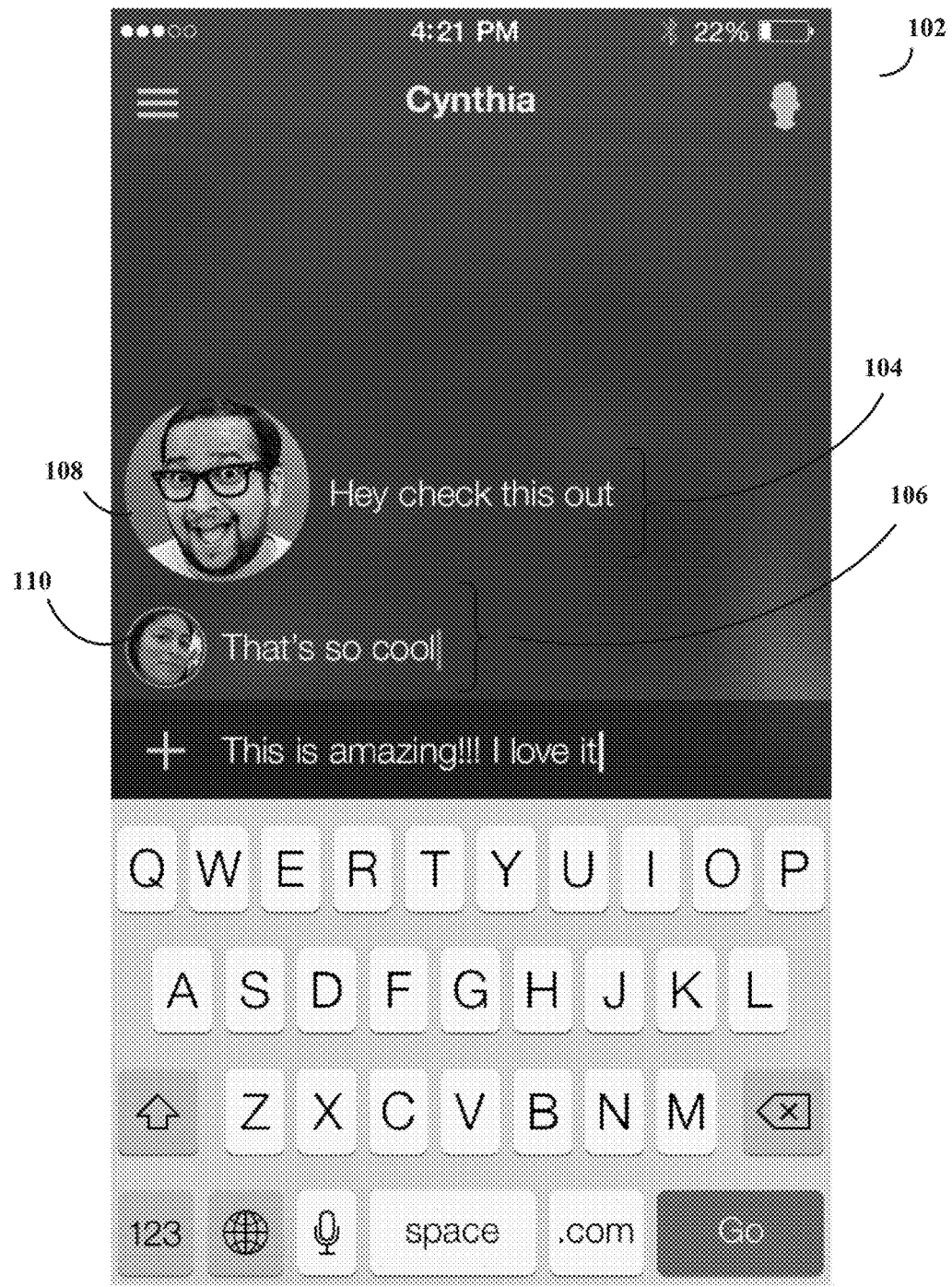

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In connection with one or more embodiments, a media item may comprise content, which may include one or more of text, image, audio, video, or the like, which may be processed in the form of physical signals, such as electrical signals, for example, or may be stored in memory, as physical states, for example. Content may also be referred to as an item of content, a content item, etc. A media item may comprise one or more content items.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a personalized mood icon capture and retrieval system, method and architecture. Herein, the term mood may be used to refer to one or more of mood, emotion, tone, etc. In accordance with one or more embodiments, one or more media items depicting an expression of the user, is/are obtained, an icon is generated from some or all of the one or more media items obtained, the mood icon is personalized for the user and comprises the user's expression of the mood, emotion, tone, etc., and an association is made with the user and the personalized mood icon. A relationship may be established between the user, the personalized mood icon and the mood being expressed by the user.

In accordance with one or more embodiments, a personalized mood icon may be associated with a new or an existing mood, and information associated with the mood may be used to search for and retrieve a user's personalized mood icon associated with the mood. The information associated with a mood and/or a personalized mood icon may comprise a description of the mood, which may comprise a name or title for the mood, one or more prompts, which may comprise one or more of characters, words, phrases, keyboard shortcut, etc., which may be entered to retrieve the personalized mood icon. In accordance with one or more embodiments, a retrieved personalized mood icon may be inserted in the user's input, such as and without limitation the user's personalized mood icon retrieved using a retrieval prompt found in the user's input may be inserted in the text in place of, or to supplement, the retrieval prompt that prompted retrieval of the user's personalized mood icon.

By way of a non-limiting example, the personalized mood icon may comprise visual content depicting an expression on the user's face, and the personalized mood icon may be associated with the user, such as and without limitation by associating the user's identifier, e.g., user login identifier, with an entry in a mood taxonomy, database or other data store storing mood entries. Each entry in a mood taxonomy, data store, etc. may associate a mood with one or more retrieval prompts, such as and without limitation keyboard shortcuts, character string, etc. In accordance with at least one embodiment, a mood entry may be associated with one or more icons including one or more mood icons personalized for the user. By way of a non-limiting example, a "happy" mood entry may be associated with a retrieval prompt such as and without limitation a character string containing a colon, ":", followed by an open parenthesis, ")", or ":)", and/or word "happy", etc. To further illustrate without limitation, for a happy mood, a personalized mood icon showing the user's expression of a happy mood, the user's smiling face, may be associated with a "happy" mood entry, so that the personalized mood icon may be retrieved when searching using the retrieval prompt. By way of a further non-limiting example, the personalized mood icon retrieved using the retrieval prompt may be added to text being input by the user, a text message or other user input; the personalized mood icon may be added as a replacement for the retrieval prompt.

In accordance with one or more embodiments, a personalized mood icon might be used in a status message and/or as a user's profile picture in a messaging, or other, application. By way of a non-limiting example, an instant messenger application may allow the user to use a personalized mood icon as a profile picture, and the personalized mood icon might be displayed in the application's user interface, e.g., to identify the user and/or the user's current availability.

FIG. 1 provides an example of a display including a personalized mood icon being used as a profile picture in accordance with one or more embodiments. An instant messenger application's user interface is used in this and other examples provided herein. It should be apparent that embodiments of the present disclosure need not be limited to instant messaging and that embodiments may be used in connection with a variety of programs, systems, applications, services, etc. known or later developed. In addition to instant messages, embodiments of the present disclosure might be used with electronic messaging, web postings, including without limitation blogs, social media sites, etc. In the example of FIG. 1, display 102 includes instant messages 104 and 106 from two different users and each user is using a personalized mood icon for their profile picture. In the example, the user's profile picture is displayed in connection with the user's message, i.e., personalized mood icon 108 is displayed along with message 104 and personalized mood icon 110 is displayed with message 106.

Figure 2:
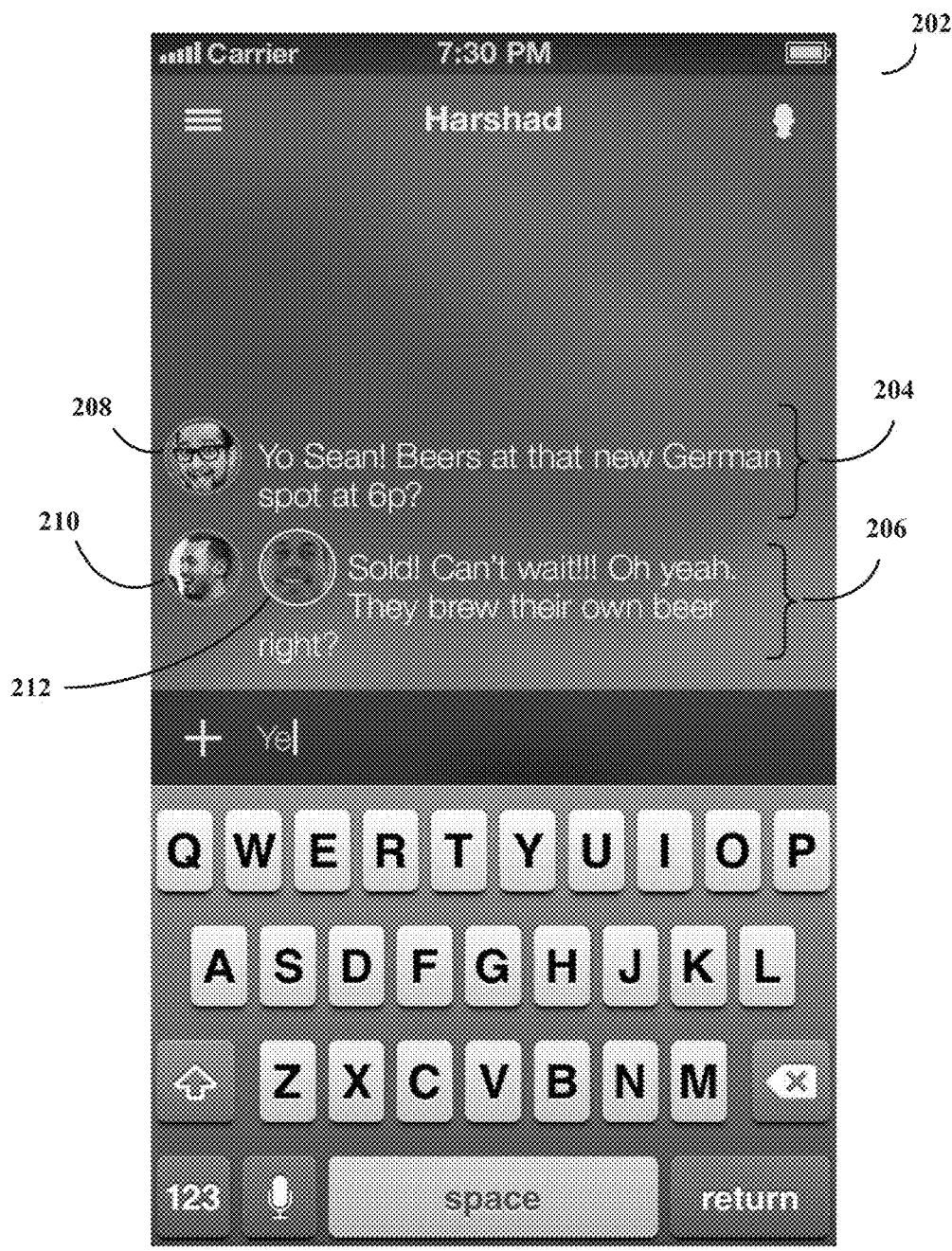

In accordance with one or more embodiments, a personalized mood icon may be included in a user's message, as is shown in FIG. 2. As in the example shown in FIG. 1, in the example of FIG. 2, a personalized mood icon is used as a profile picture of each user, which profile picture is displayed along with each user's message 204 or 206. In the example of FIG. 2, a personalized mood icon is also being displayed in the body of a message, e.g., message 206. The personalized mood icon 212 might be a newly-created icon or a previously-created icon. Personalized mood icon 212 might be inserted in message 206 in response to a retrieval prompt, e.g., ":)", entered by the user in message 206. If personalized mood icon 212 was previously-created for the user, the user's ID might be used along with the personalized mood icon's retrieval prompt to retrieve the personalized mood icon 212 from a data store. Alternatively, if there is no personalized mood icon associated with the retrieval prompt for the user, the user might be prompted to generate the personalized mood icon 212. By way of a non-limiting example, the prompt might inform the user that there is no personalized mood icon associated with the mood associated with the retrieval prompt and ask the user whether he/she wishes to add a personalized mood icon. If a user response is received that indicates that the uses wishes to create a personalized mood icon, the user may be given the opportunity to access a media item capture device to capture the media item from which the personalized mood icon may be generated. Alternatively, the user may be given the opportunity to identify an existing media item to be used to generate the personalized mood icon.

Figure 3:
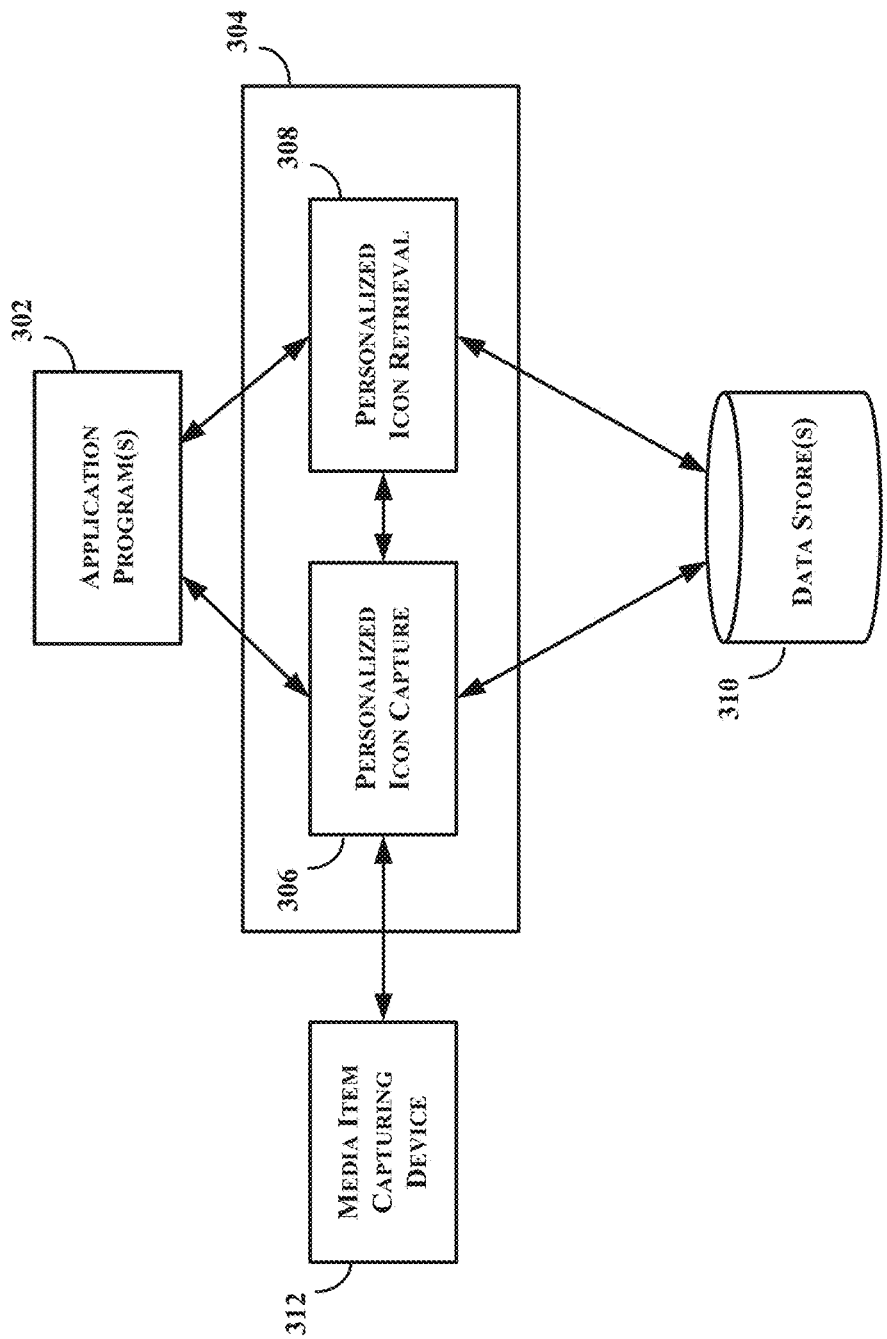

FIG. 3 illustrates some components for use in connection with one or more embodiments of the present disclosure. In the example of FIG. 3, component 304 comprises a personalized mood icon capture component 306 and a personalized mood icon retrieval component 308. Component 304, or portions of component 304, may reside on a user's computing device and/or on a server computing device. While component 304 is shown comprising both components 306 and 308, component 304 may comprise one or the other of components 306 and 308. While the components depicted in FIG. 3 are depicted as separate components, it should be apparent that some or all of the components may be combined into a single component. In accordance with one or more embodiments, it is anticipated that once a personalized mood icon is generated and associated with a user and a mood, personalized mood icon retrieval may be performed by a personalized mood icon retrieval component 308 and/or one or more of the application program(s) 302 or other components. By way of a non-limiting example, the application program(s) 302 might retrieve a personalized mood icon, e.g., from data store 310. Application program(s) 302 may comprise any application now known or later developed. In accordance with one or more embodiments, one or more of the components shown in FIG. 3 may be implements using hardware, software of a combination of hardware and software.

In accordance with one or more embodiments, personalized mood icon capture component 306 is configured to communicate with a media item capturing device 312 to obtain one or more media items that may be used to generate a personalized mood icon depicting the user's expression of the mood. Alternatively, personalized mood icon capture component 306 might retrieve the media item(s) from a data store 310 and/or the capturing device 312. Personalized mood icon capture component 306 may be in communication with the application program(s) 302 to determine if the user wishes to create a personalized mood icon. By way of a non-limiting example, the determination may be in response to user input of a retrieval prompt input by the user using the application program 302. By way of a further non-limiting example, the retrieval prompt may be a character string associated with a mood in a mood taxonomy, database or other data store, which character string might comprise one or more characters. By way of another non-limiting example, the user might indicate a desire to access a library mode where the user may be able to modify and/or add one or more personalized mood icons to a library of personalized mood icons associated with the user.

Figure 4:
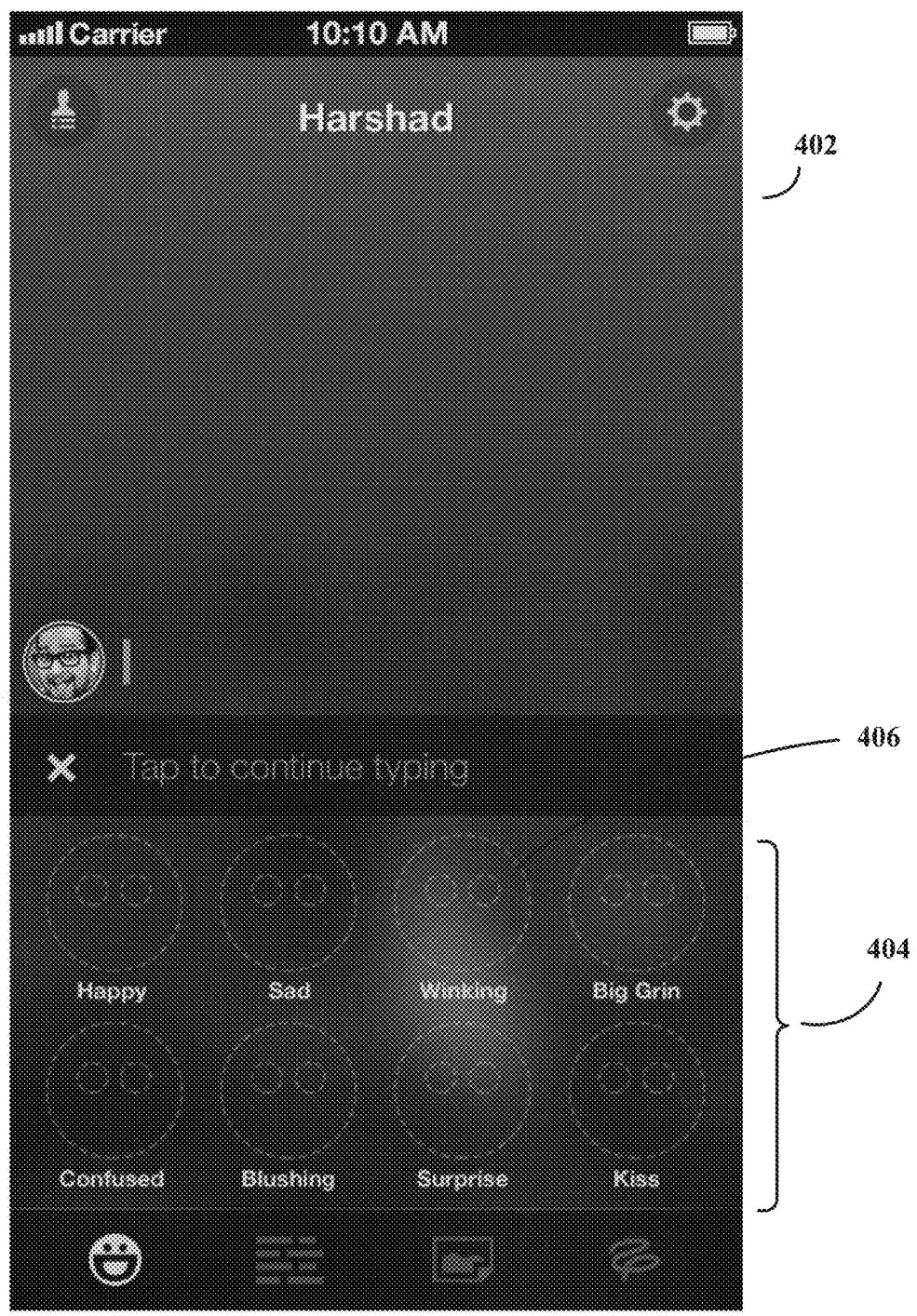

FIG. 4 provides an example of a library mode user interface, which might be displayed at a user's computing device, for example and without limitation. The library mode user interface may be used in accordance with one or more embodiments of the present disclosure to add one or more personalized mood icons for the user. In the example shown in FIG. 4, the library may comprise a plurality of personalized mood icons, each of which may depict the user's face and eyes. In accordance with one or more embodiments, the user might use the library mode to view the user's existing personalized mood icons, change an existing icon, add a new icon, etc. The user might also use the library mode to add a new mood and generate a personalized mood icon for the new mood.

Embodiments of the present disclosure may operate with one or more types of content including without limitation one or more, and/or any combination, of video, audio, multimedia, etc., such that the user's personalized mood icon may comprise one or more, and/or any combination, of video, audio, multimedia, etc. By way of a non-limiting example, a mood icon might be a personalized animation comprising one or more frames of content of a user, e.g., a user's face; the animation might be a graphics interchange format, or gif, file containing one or more content frames capturing the user. By way of a further non-limiting example, a mood icon may comprise audio content including audio content capturing the vocal expression(s) of the user alone or in combination with other audio content and/or video content.

With reference to FIG. 4, display 402 includes an area 404 in which a plurality of personalized mood icons may be viewed. Area 404 displays a personalized mood icon along with an identification of the associated mood, e.g., "Happy," "Sad," "Winking," etc. In the example, area 404 indicates that the user has not yet created any personalized mood icons. If the user creates one or more personalized mood icons, the icon(s) would be displayed in area 404. Although not shown in the example, display 402 may include scrolling capabilities to allow the user to scroll through the user's library of personal mood icons. To illustrate without limitation, assuming that user wishes to create a "Winking" personalized mood icon, the user might select blank icon 406. Blank icon 406, as well as the other blank icons displayed in area 404, provide an example of an outline for the personalized mood icon. Alternatively, the user might click on the word "Winking" to select the mood and create a personalized mood icon to be associated with the selected mood.

In response to the user's selection of a mood indicating a desire to replace an existing, or create a new, personalized mood icon, personalized mood icon capture component 306 may communicate with media item capturing device 312 to cause a media item capture user interface to be displayed at the user's computing device. By way of a non-limiting example, the user interface may comprise at least a portion of the user interface provided by capture device 312, so that the user may interact with capture device 312 to capture a media item whose content, or content portion thereof, may be used to create a personalized mood icon depicting the user's expression of the associated mood.

Figure 5:
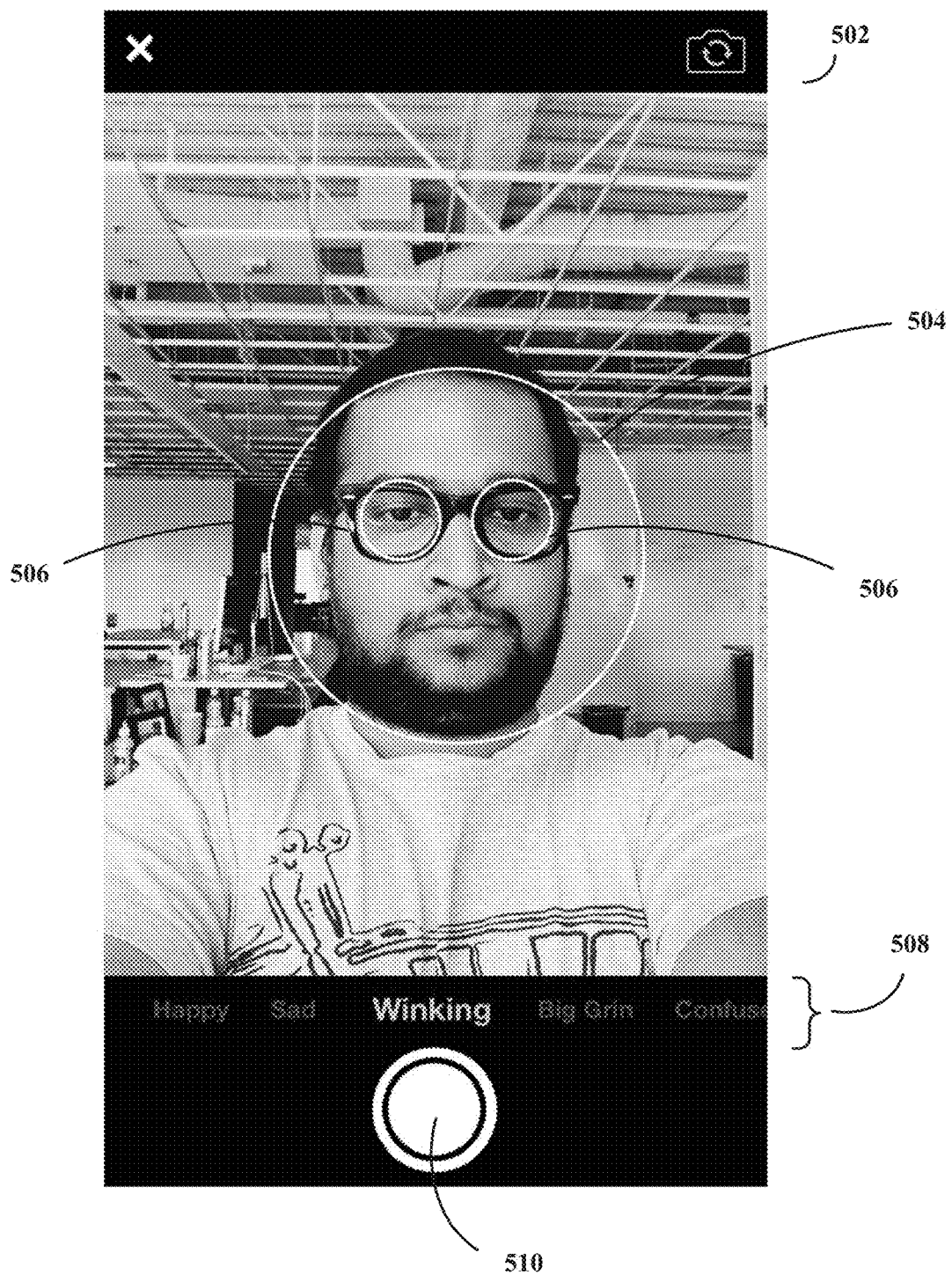

FIG. 5 provides an example of a user interface that may be used to capture an image or video of the user that may be used in generating a personalized mood icon in accordance with one or more embodiments. User interface display 502 includes an outline 504, which is similar to the outline of icon 406 selected by the user. The outline 504 may be used as an indicator of a shape of a personalized mood icon and indicators 506 provide a guide as to the location of the user's eyes within the outline 504. As shown in the example, outline 504 may be superimposed on the image being output by device 312 and displayed in user interface 502. By way of a non-limiting example, outline 504, may be used as a guide for the user to control device 312, e.g., position the lens and/or to zoom in or out, etc., to capture some or all of the user's expression, which in this example is a visual expression, in the media item. In the example, the media item that is being captured is a photograph of the user's face and the outline 504 includes outline 506, and both outlines provide the user with feedback as to how a personalized mood icon that is generated from the displayed image might appear. In the example shown in FIG. 5, the user's face is primarily within outline 504A and the user's eyes are primarily within outline 506. In the example of FIG. 5, the user may select button 510 to capture the image, e.g., the image being displayed in user interface 502.

Figure 6A:
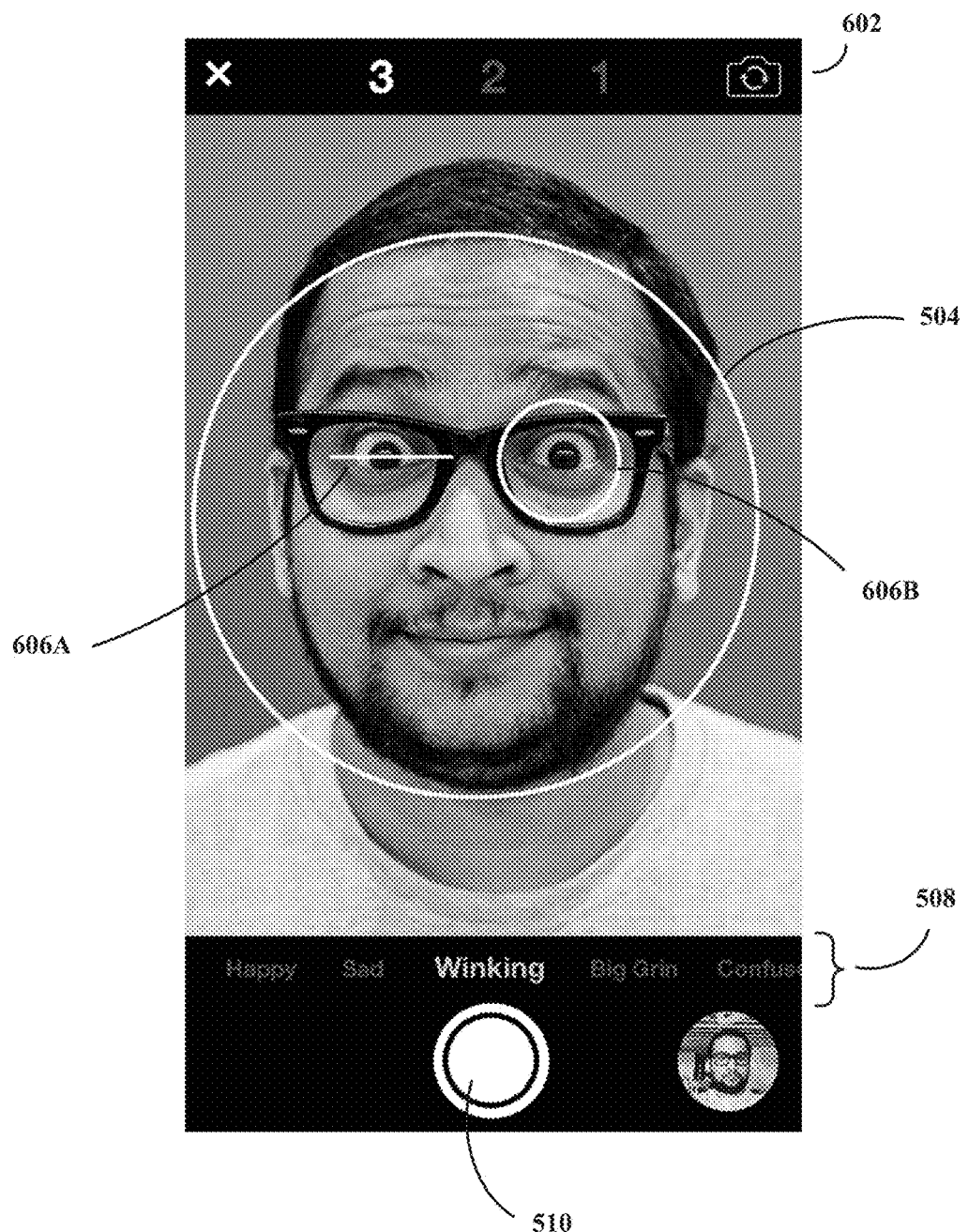
Figure 6B:
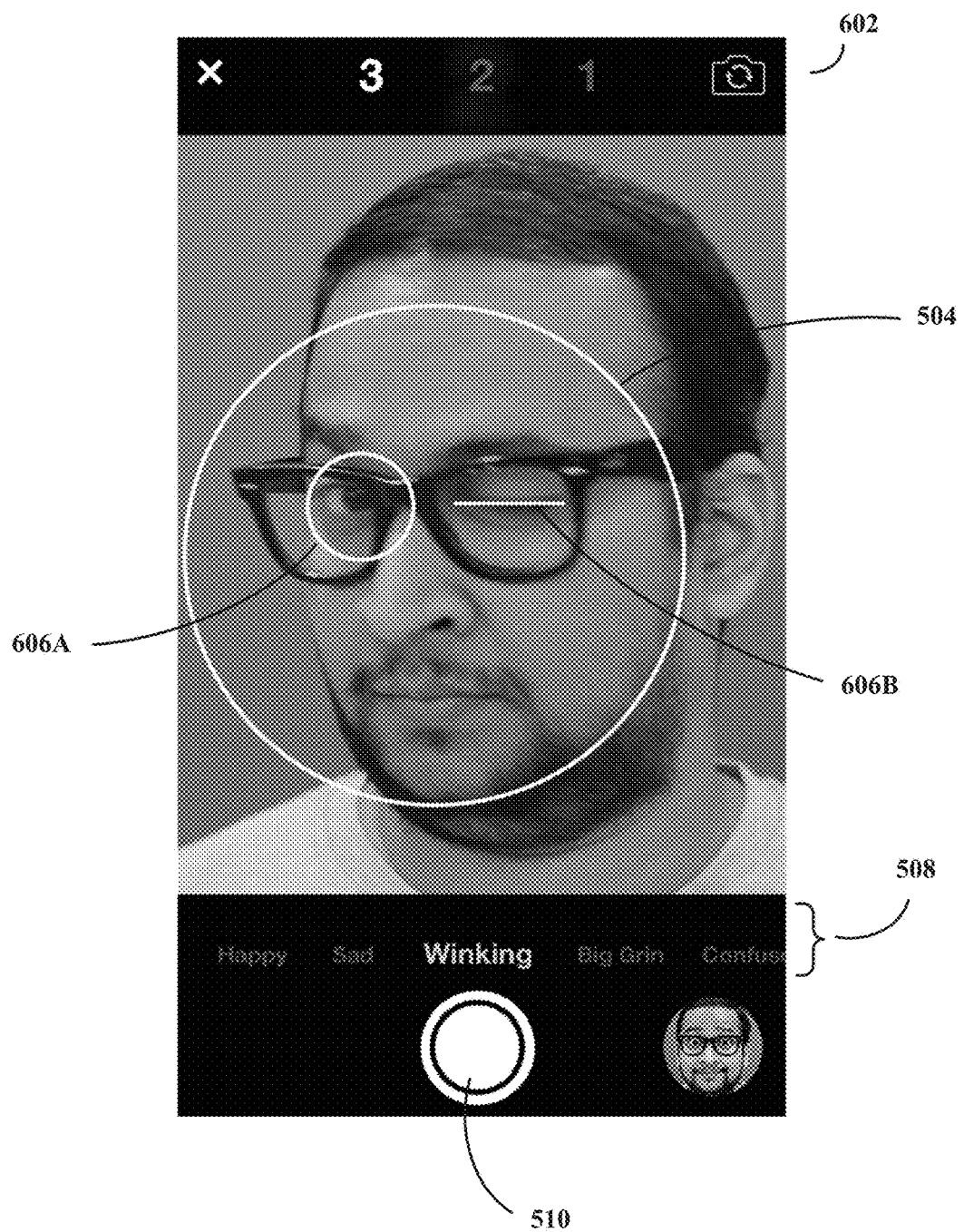

In accordance with one or more embodiments, outline 504 and/or outline 506 might be specific for a given user; alternatively, general outlines might be used for a number of users. In accordance with one or more embodiments, different outlines, or stencils, may be used based on the expression that is being captured. By way of one non-limiting example, instead of outline 506 used in the example of FIG. 5, an outline, or stencil, that prompts the user to wink an eye might be used to prompt the user to use a winking expression for the "Winking" mood icon. FIG. 6, which comprises FIGS. 6A and 6B, provides examples of outlines that may be used for winking in accordance with one or more embodiments. With reference to FIG. 6A, outline 504 provides a guide for a perimeter of the icon. Outline 606 provides a guide for a location of the user's eyes and also illustrates that one eye, in this case the user's right eye, is to be closed and the other eye, in this case the user's left eye, is to remain open. In the example of FIG. 6A, outline 606A is a straight line to illustrate that the right eye is to be closed and outline 606B is a circle illustrating that the left eye is to be open. Referring to FIG. 6B, outline 606 is reversed, such that outline 606A indicates that the user's right eye is to remain open and outline 606B indicates that the user's left eye is to be closed. As is illustrated in the examples of FIGS. 6A and 6B, the position of one or more of outlines 504, 606A and 606B may change based on the position of the user, e.g., the positioning of the user's head and/or eyes, in the media item content being captured by the media item capturing device, e.g., the image being captured by the camera internal to the user's device.

Embodiments of the present disclosure are not limited to facial expression(s). By way of a non-limiting example, embodiments may capture a user's expression using the user's hands, e.g., clapping, hugging; the user's feet or body, e.g., dancing, walking, skipping; etc. By way of a further non-limiting example, the user might use his/her hands to express a "big hug", which expression may be captured and used to generate a "big hug" personalized mood icon. Another non-limiting example may involve the user using his/her hands in a clapping motion, which expression may be captured for use as a personalized mood icon. Such expressions may take the form of a still image, multiple frames forming an animation, etc.

Referring again to FIG. 5, area 508 of user interface display 502 displays different moods, and the user's current mood selection, "Winking," is highlighted. If the user selects button 510 with the current selection, a "Winking" personalized mood icon may be generated using content from the currently displayed image. By way of a non-limiting example, the portion of the captured image that is within outline 504 might be used for the "Winking" personalized mood icon. In accordance with one or more embodiments, a scrolling capability may be provided so that the user may scroll through the various selectable mood options, to select a mood other than "Winking." By way of a non-limiting example, the user might use the scrolling capability to change from the currently-selected "Winking" mood to another mood, such as "Happy." In accordance with one or more embodiments, area 508 may include an ability to create a new mood, and user interface 502 may be used to capture an image from which a personalized mood icon may be generated for the new mood.

Referring again to FIG. 3, in response to receiving an indication that the user selected button 510, which indication may include receipt by personalized mood icon capture component 306 of a media item from media item capturing device 312, personalized mood icon capture component 306 may generate a personalized mood icon using some or all of the content of media item received from device 312, e.g., the image depicted in display 502 of FIG. 5. Component 306 may use a facial recognition, or detection, tool to identify a portion of the image, e.g., the portion of the image within outline 504, to use in generating the personalized mood icon. In addition, personalized mood icon capture component 306 may store the personalized mood icon in data store(s) 310. Component 306 may also store information to associate the personalized mood icon with the user and with an existing mood.

In accordance with one or more embodiments, data store(s) 310 may comprise one or more tables or other data structures to store user identification information, mood identification information and personalized mood icon identification information. Information stored in data store(s) 310 may be used by personalized mood icon retrieval component 308 to retrieve a user's personalized mood icon and/or to determine that a given mood does not have an associated personalized mood icon for a given user, in which case, a request may be forwarded to personalized mood icon capture component 306 to generate a personalized mood icon for association with the given mood and user.

By way of a non-limiting example, a user may enter a retrieval prompt while typing a text message using an instant message application program, which program may be one of the application program(s) 302, retrieval component 308 may use the retrieval prompt and the user's identification information to search data store(s) 310 for a personalized mood icon for the user and the mood associated with the retrieval prompt. If the retrieval component 308 finds a personalized mood icon associated with the retrieval prompt and the user, it may forward the personalized mood icon to the application program for insertion in the text message, e.g., to supplement, or as a replacement for, the retrieval prompt in the text message.

Figure 7:
Figure 8:
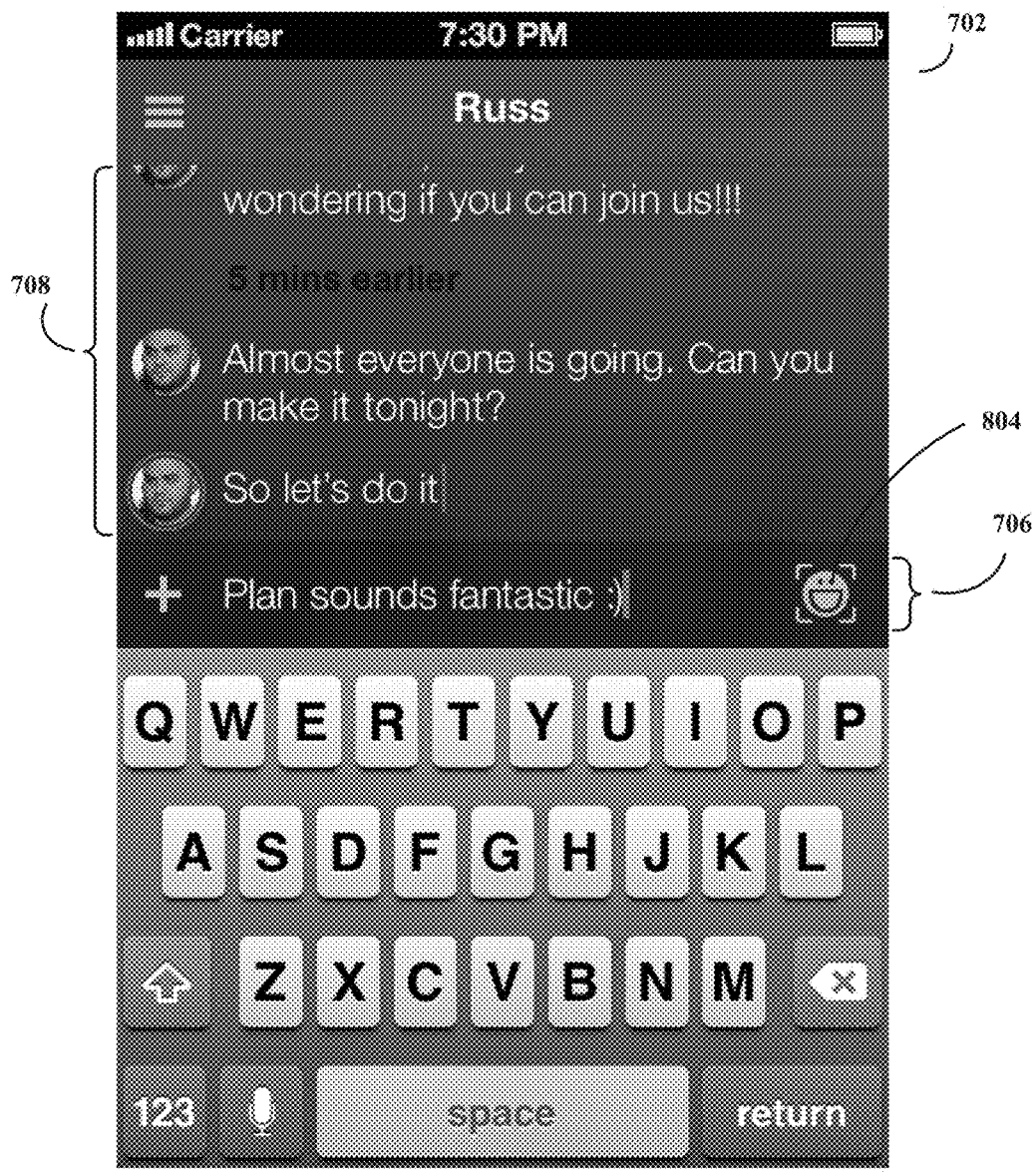

One or more embodiments may monitor the input received from the user, e.g., text of the user's message input, to detect a retrieval prompt, e.g., ":" followed by ")". Where the retrieval prompt has a corresponding personalized mood icon, the personalized mood icon may be added to the user's input, e.g., the personalized mood icon may be inserted in place of the retrieval prompt or be inserted in addition to the retrieval prompt. FIGS. 7 and 8 provide examples using user input in an instant messaging application user interface in capturing and retrieval of a personalized mood icon in accordance with one or more embodiments of the present disclosure. While the examples shown in FIGS. 7 and 8 are described with reference to an instant messaging application, it should be apparent that any other application program may be used with embodiments of the present disclosure.

Referring to FIG. 7, user interface 702 may be output by an instant messaging program, which may be one of the application program(s) 302 of FIG. 3. The user interface 702 includes an area 708 displaying instant messages sent and/or received. As shown in other examples, a personalized mood icon may be displayed in a sent/received message displayed in area 708. e.g., personalized mood icon 212 displayed as part of message 202 in user interface 202 of FIG. 2. Area 706 of user interface 702 displays a message currently being input by the user using the instant messaging program. In the example, the message input received from the user includes a retrieval prompt, ":" followed by ")". In the example, the retrieval prompt corresponds to a "Happy" mood, which might be personally expressed by the user in a personalized mood icon showing the user's smiling face. In the example shown in FIG. 7, the user has a personalized mood icon 706 associated with the ":)" retrieval prompt input by the user. In response to detecting the retrieval prompt, the personalized mood icon 706 may be retrieved and displayed in the user interface 702, e.g., in area 706 of user interface 702, and may be added to the message shown in area 706, e.g., prior to sending the message. By way of a non-limiting example, the personalized mood icon 706 may be inserted in response to the user's input indicating a desire to send the instant message, e.g., by pressing a button such as return button 710. By way of a further non-limiting example, the user might tap on the icon 706 to add it to the message. By way of yet another non-limiting example, the icon 706 may be added automatically, e.g., in response to receiving additional message input, such as key or space bar input, and/or after a given amount of time passes, or elapses, after the retrieval prompt input.

In the example of FIG. 7, an existing personalized mood icon corresponded to the received retrieval prompt input from the user. FIG. 8 provides an example of user interface 702 in a case that a corresponding personalized mood icon is not found for the retrieval prompt input in area 706. In the example of FIG. 8, icon 804 is displayed in response to detecting the retrieval prompt ":)". By way of a non-limiting example, a search for a personalized mood icon corresponding to the detected retrieval prompt may be performed, and in response to a determination that no corresponding personalized mood icon was found by the search, the user interface 702 may display icon 804. The user may select icon 804 to generate a personalized mood icon, e.g., personalized mood icon 704. By way of some non-limiting examples, user selection of icon 804 may result in a personalized mood icon capture user interface being displayed, such as any of the user interface examples shown in FIGS. 4, 5 and 6. Referring again to FIG. 7, user selection of icon 704 might also result in a personalized mood icon capture user interface being displayed. In such a case, the user might be able to create a new personalized mood icon to associate with, and/or change the personalized mood icon currently associated with, a retrieval prompt entered by the user using user interface 702.

Figure 9:
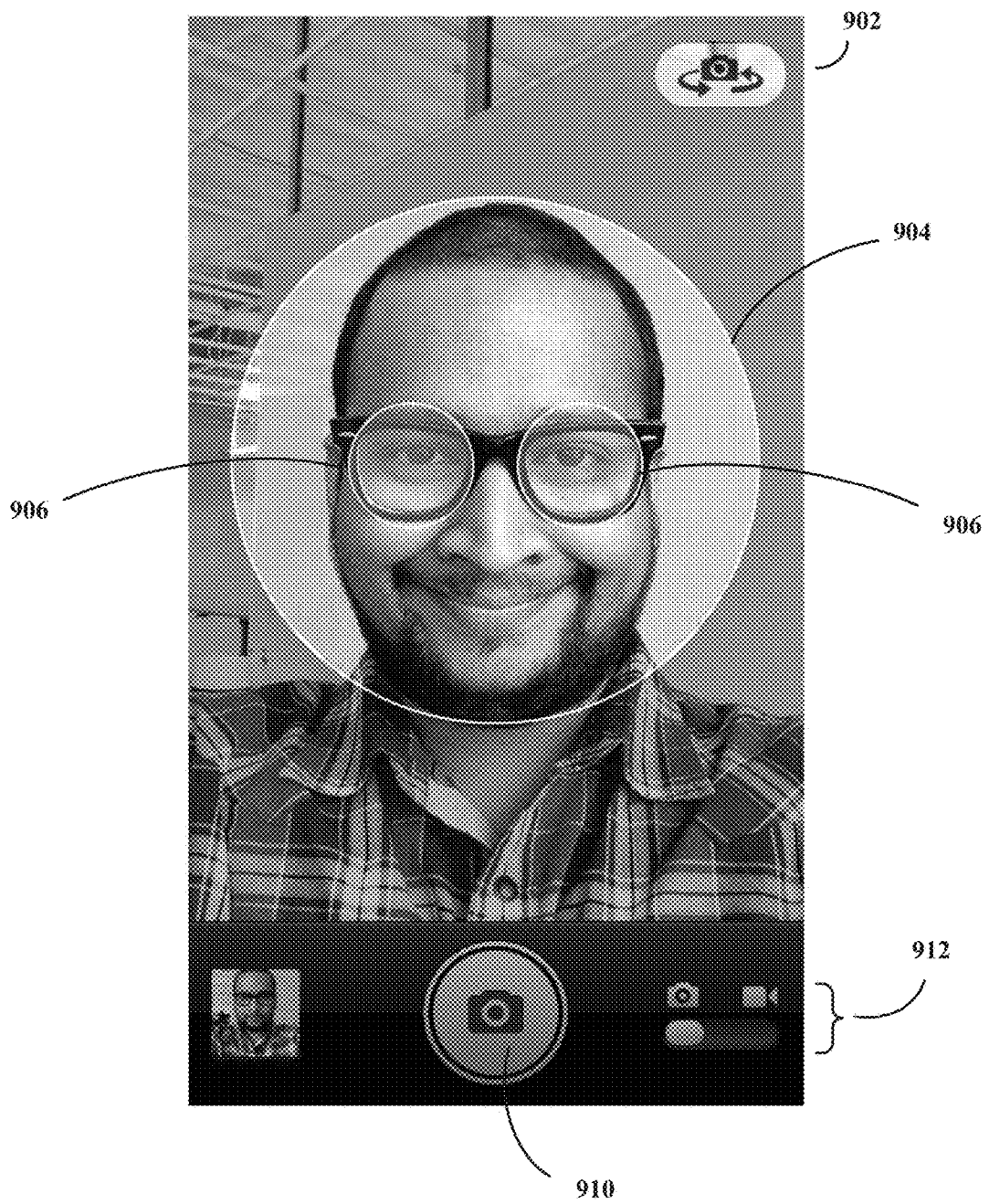

FIG. 9 provides another example of a media item capture user interface for use in accordance with one or more embodiments of the present disclosure. User interface 902 might be displayed to the user in response to retrieval component 308 determining that there is no personalized mood icon associated with the user for the mood associated with the retrieval prompt entered by the user. As with outlines 504 and 506, outlines 904 and 906 may be included in the user interface 902 to illustrate the portion of the image that might be used for the personalized mood icon. User interface 902 includes controls 912, which allow the user to switch between capturing a still image and/or a video. Button 910 may be used to capture the media item detected by the capture device 312, e.g., the image that is being displayed in user interface 902. It should be apparent that user interface 902 may be used to capture any type of content showing the user's expression. Furthermore, it should be apparent that the captured content may include without limitation one or more, and/or any combination, of video, audio, multimedia, etc. Additionally, the content and a mood icon generated from the content may comprise a single frame of content, one or more frames of streaming content, which streaming content may comprise one or more, and/or any combination, of audio, video, multimedia, etc. It should also be apparent that a personalized mood icon may comprise one or more frames of content showing the user, which frame(s) may be used to generate a personalized mood icon; e.g., multiple frames may be used to generate a personalized animation of the user.

Figure 10:
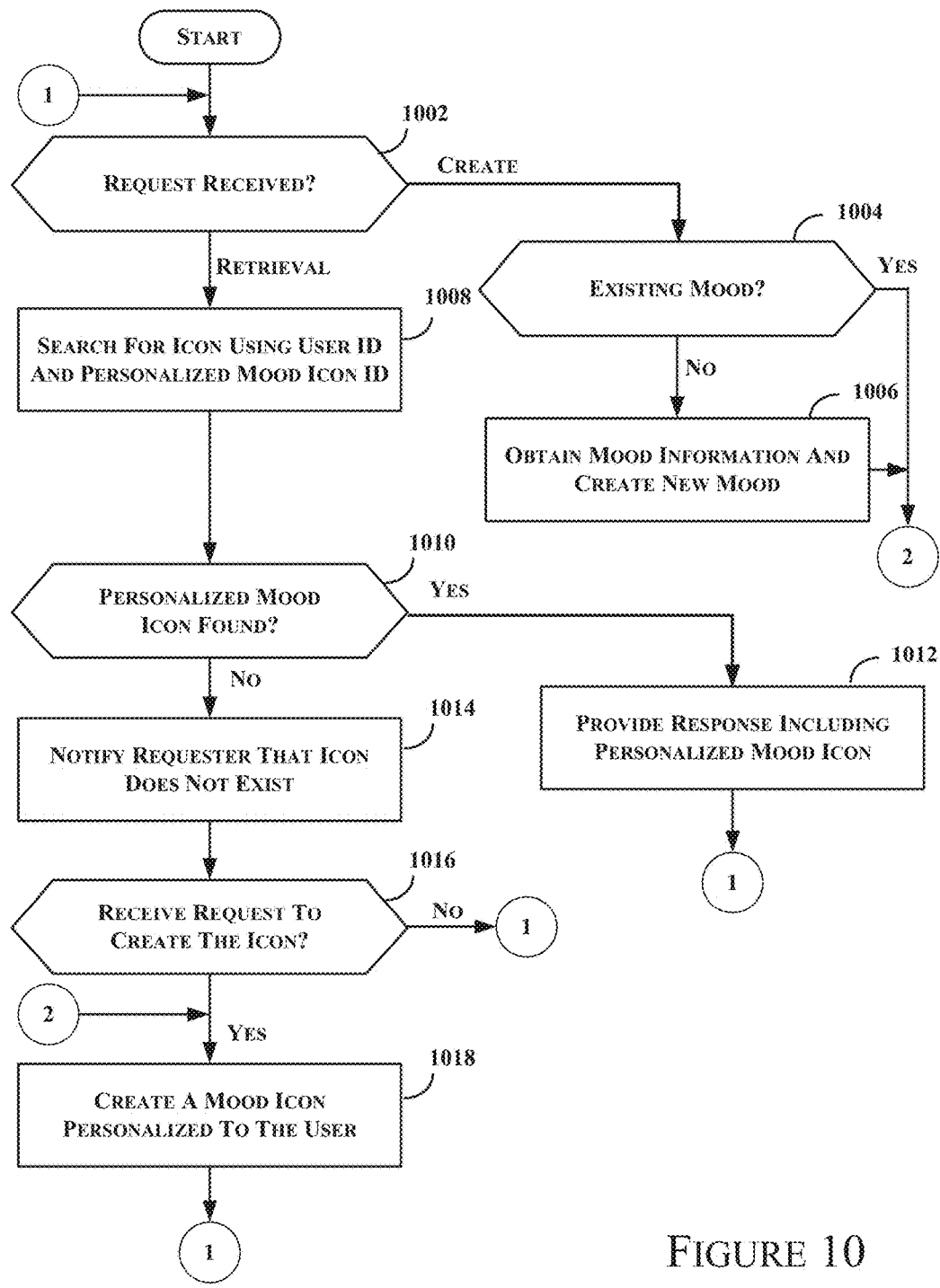

FIG. 10 provides a process flow example in accordance with one or more embodiments of the present disclosure. At step 1002, a determination is made whether or not a request is received. By way of some non-limiting examples, a received request might be a request to retrieve a personalized mood icon, a request to create a mood for which a personalized mood icon may be created and/or to create a personalized mood icon for an existing mood. If it is determined, at step 1002, that the request is a create request, processing continues at step 1004 to make a determination whether the request is a mood creation request or a personalized mood icon creation request. If it is determined, at step 1004, that the request is to create a personalized mood icon for an existing mood, processing continues at step 1018 to create the personalized mood icon, the personalized mood icon being personalized for a given user such that the personalized mood icon depicts the user's expression of the mood.

If it is determined, at step 1004, that the received request is a request to create a mood to which a personalized mood icon may be associated, processing continues at step 1006 to obtain information for the mood and to create the new mood. In accordance with one or more embodiments, the new mood may be added to an existing database, data store, taxonomy, etc. of moods. By way of a non-limiting example, the mood information may include one or more retrieval prompts, each of which may comprise a string of one or more characters; the mood information may further comprise a title or other description of the mood. The description, or title, may be a retrieval prompt. By way of a further non-limiting example, a new "Happy" mood might use the character string(s) ":)" and/or "happy" as retrieval prompts and/or title, or descriptive, information. After the new mood is created, processing continues at step 1018 to create the personalized mood icon. Processing continues at step 1002 to process any further received request(s).

Figure 11:
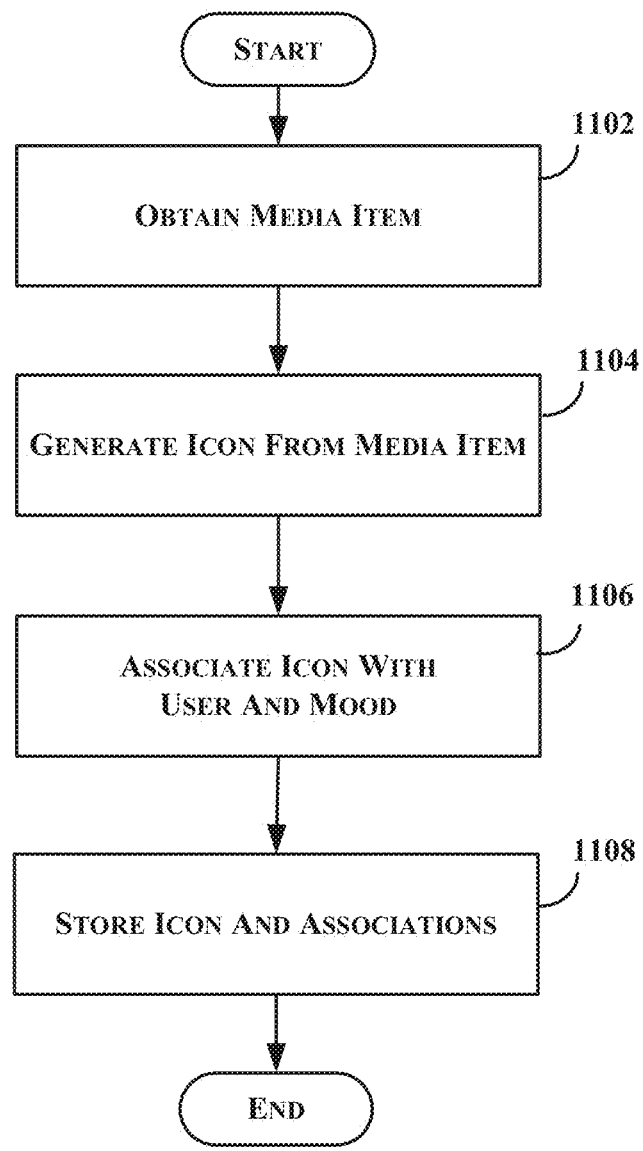

FIG. 11 provides an example of a personalized mood icon creation process flow in accordance with one or more embodiments of the present disclosure. At step 1102, one or more media items is/are obtained. As disclosed herein, the media item(s) may be obtained from a data store, in a case of a pre-existing media item, or the media item(s) may be obtained from a media item capturing device, such as an audio and/or video recorder, still and/or video camera, etc. At step 1104, the media item(s) is/are used to generate the personalized mood icon using some or all of the content from the media item(s). In accordance with one or more embodiments, the content used to create the personalized mood icon for a user depicts the user's expression of the mood associated with the personalized mood icon. At step 1106, the personalized mood icon is associated with the user depicted in the personalized mood icon and the information about the mood. At step 1108, the personalized mood icon and associations and information may be stored in one or more data stores, e.g., data store(s) 310 of FIG. 3.

Referring again to FIG. 10, if it is determined, at step 1002, that the received request is a request to retrieve a user's existing personalized mood icon, processing continues at step 1004 to search one or more data stores, e.g., data store(s) 310 of FIG. 3, for the personalized mood icon associated with the user. By way of a non-limiting example, the search for the existing personalized mood icon to be retrieved might use the user's user identifier, e.g., the user's login ID, and a retrieval prompt associated with the personalized mood icon; the retrieval prompt being used as an identifier for the personalized mood icon. At step 1010, a determination is made whether the personalized mood icon was found in the search. If so, processing continues at step 1012 to provide a response to the received request that includes the personalized mood icon. By way of some non-limiting examples, the personalized mood icon may be communicated to an application program 302 and may be inserted in user input comprising the retrieval prompt, with the personalized mood icon being inserted with or without replacing the retrieval prompt in the user's input. By way of some further non-limiting examples, the user's input might comprise a number of characters in a message, such as and without limitation a text message, an email, word processing document, spreadsheet, blog post, social media website post, web post, etc., and the personalized mood icon may be inserted in the message.

If it is determined, at step 1010, that personalized mood icon was not found in the search performed at step 1008, processing continues at step 1014 to notify the requester, e.g., the application program 302, that the personalized mood icon was not found. In accordance with one or more embodiments, the notification might result in the user being prompted to create a personalized mood icon. By way of a non-limiting example, the request to retrieve a personalized mood icon might be received from the application program 302 that is receiving the user's input, which input includes a retrieval prompt, and an option may be presented to the user to create a personalized mood icon for a new or existing mood associated with the retrieval prompt. By way of a further non-limiting example, the option to create a personalized mood icon and/or a new mood might be presented to the user via a user interface, such as and without limitation the user interface being output by the application program 302.

At step 1016, a determination is made whether or not a request is received from the user to create a personalized mood icon for the new or existing mood associated with the retrieval prompt. If no request is received, processing continues at step 1002 to await any further personalized mood icon requests. If it is determined, at step 1016, that a request is received to create a personalized mood icon, processing continues at step 1018 to create the mood icon personalized to the user. As discussed herein, the process flow such as that shown in FIG. 11 may be used to create the personalized mood icon. Processing continues at step 1002 to process any further received request(s).

Figure 12:
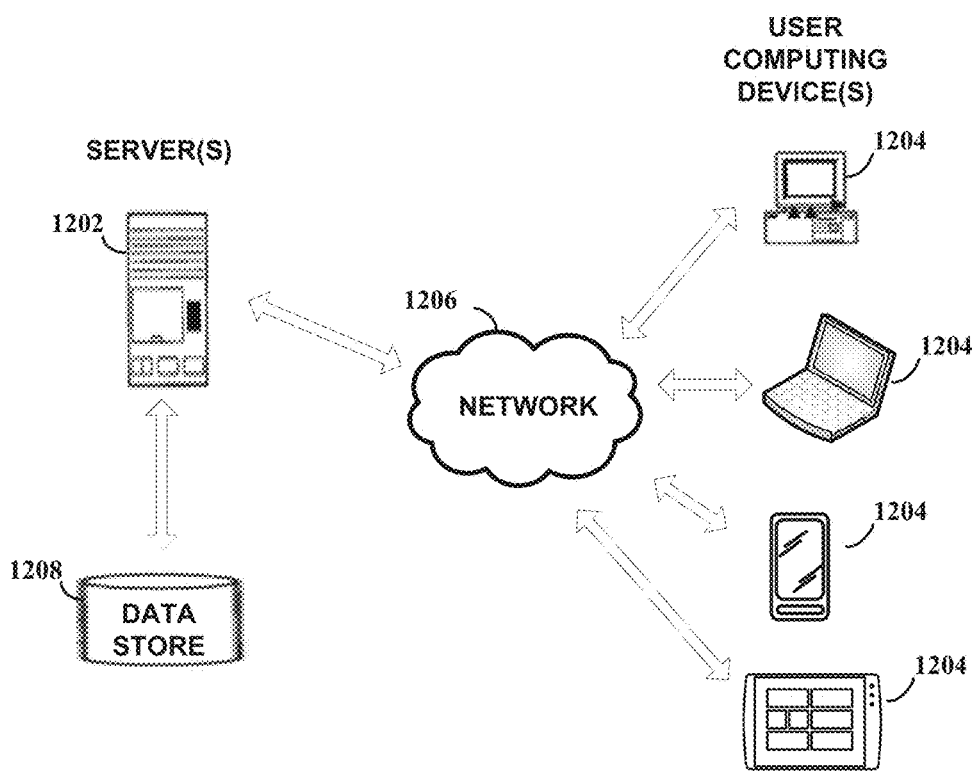
FIG. 12 illustrates some components that can be used in connection with one or more embodiments of the present disclosure.

FIG. 12 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1202 may be configured to execute program code, instructions, etc. to provide functionality in accordance with one or more embodiments of the present disclosure.

Computing device 1202 can serve data to user computing devices 1204 using a browser application, messaging application, etc. via a network 1206. Data store 1208, which can include data store(s) 310, may be used to store information such as and without limitation media item(s); personalized mood icon(s); user information; stored relationships between mood(s), user(s) and personalized mood icon(s); and/or program code to configure a server 1202 in accordance with one or more embodiments of the present disclosure.

The user computing device 1204 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1202 and the user computing device 1204 can include one or more processors, memory, a removable media reader, network interface, display and interface, and one or more input devices, e.g., keyboard, keypad, mouse, etc. and input device interface, for example. One skilled in the art will recognize that server 1202 and user computing device 1204 may be configured in many different ways and implemented using many different combinations of hardware, software, or firmware. User computing device 1204 may include one or more data stores that may be used to store information such as and without limitation media item(s); personalized mood icon(s), user information, stored relationships between mood(s), user(s) and personalized mood icon(s), and/or program code to configure the computing device 1204 in accordance with one or more embodiments of the present disclosure.

In accordance with one or more embodiments, a computing device 1202 can make a user interface available to a user computing device 1204 via the network 1206. The user interface made available to the user computing device 1204 can include content items, or identifiers (e.g., URLs) selected for the user interface in accordance with one or more embodiments of the present invention. In accordance with one or more embodiments, computing device 1202 makes a user interface available to a user computing device 1204 by communicating a definition of the user interface to the user computing device 1204 via the network 1206. The user interface definition can be specified using any of a number of languages, including without limitation a markup language such as Hypertext Markup Language, scripts, applets and the like. The user interface definition can be processed by an application executing on the user computing device 1204, such as a browser application, to output the user interface on a display coupled, e.g., a display directly or indirectly connected, to the user computing device 1204.

In an embodiment the network 1206 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 12. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 13:
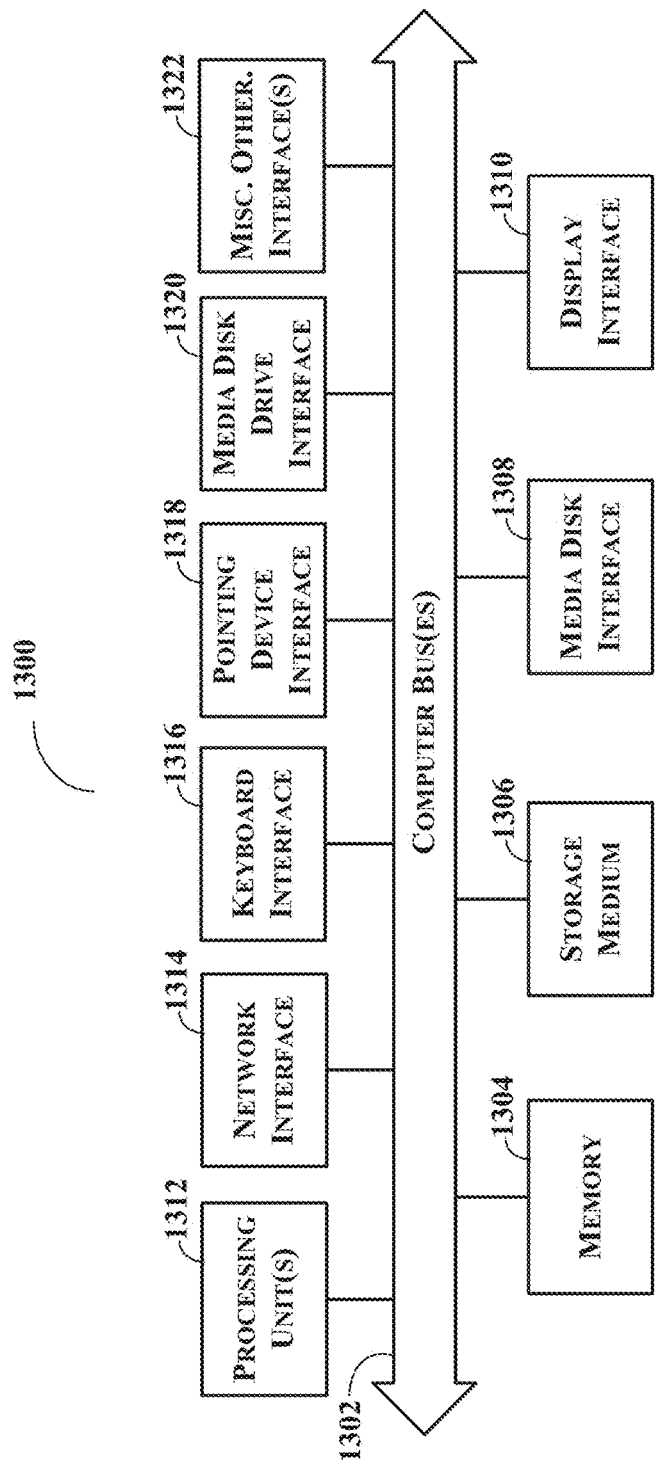
FIG. 13 is a detailed block diagram illustrating an internal architecture of a computing device in accordance with one or more embodiments of the present disclosure.

FIG. 13 is a detailed block diagram illustrating an internal architecture of a computing device, e.g., a computing device such as server 1202 or user computing device 1204, in accordance with one or more embodiments of the present disclosure. As shown in FIG. 13, internal architecture 1300 includes one or more processing units, processors, or processing cores, (also referred to herein as CPUs) 1312, which interface with at least one computer bus 1302. Also interfacing with computer bus 1302 are computer-readable medium, or media, 1306, network interface 1314, memory 1304, e.g., random access memory (RAM), run-time transient memory, read only memory (ROM), etc., media disk drive interface 1320 as an interface for a drive that can read and/or write to media including removable media such as floppy, CD-ROM, DVD, etc. media, display interface 1310 as interface for a monitor or other display device, keyboard interface 1316 as interface for a keyboard, pointing device interface 1318 as an interface for a mouse or other pointing device, and miscellaneous other interfaces not shown individually, such as parallel and serial port interfaces, a universal serial bus (USB) interface, and the like.

Memory 1304 interfaces with computer bus 1302 so as to provide information stored in memory 1304 to CPU 1312 during execution of software programs such as an operating system, application programs, device drivers, and software modules that comprise program code, and/or computer-executable process steps, incorporating functionality described herein, e.g., one or more of process flows described herein. CPU 1312 first loads computer-executable process steps from storage, e.g., memory 1304, computer-readable storage medium/media 1306, removable media drive, and/or other storage device. CPU 1312 can then execute the stored process steps in order to execute the loaded computer-executable process steps. Stored data, e.g., data stored by a storage device, can be accessed by CPU 1312 during the execution of computer-executable process steps.

Persistent storage, e.g., medium/media 1306, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
identifying, via at least one computing device of a messaging system, a mood;
obtaining, via the at least one computing device of the messaging system, a media item, at least a portion of the media item comprising an image of the user, the image in the media item depicting a respective expression of a user;
using, via the at least one computing device of the messaging system, the at least a portion of the media item comprising an image of the user depicting a respective expression of the user for a personalized mood icon for the user; and
storing, via the at least one computing device of the messaging system, the personalized mood icon and a relationship between the user and the personalized mood icon in a personalized mood icon library comprising a number of personalized mood icons, each stored personalized mood icon, comprising an image of the user depicting a respective expression of the user, is associated with a mood of the user in the personalized mood icon library, each stored personalized mood icon comprising an image of the user depicting a respective expression of the user is retrievable for display as part of a body of the user's message and each stored personalized mood icon comprising an image of the user depicting a respective expression of the user is selectable by the user as the user's profile picture that is to be displayed adjacent to the user's message when the user's message content including text and at least one personalized mood icon is displayed at a recipient user's computing device;

receiving, via the at least one computing device of the messaging system, user profile picture input indicating selection of a first stored personalized mood icon, comprising an image of the user depicting a respective expression of the user, by the user, from the personalized mood icon library, to be displayed as the user's profile picture adjacent to each message of the user displayed at the recipient user's computing device;

receiving, via the at least one computing device of the messaging system, message input from the user;

using the received message input in selecting, by the at least one computing device of the messaging system and for the user, a second stored personalized mood icon from the personalized mood icon library, the second stored personalized mood icon comprising an image of the user depicting a respective expression of the user corresponding to a particular mood of the user determined using the received message input; and in response to the received user profile picture input and the received message input, causing, via the at least one computing device of the messaging system, a display at the recipient user's computing device, the display comprising both the first personalized mood icon selected by the user, the second stored personalized mood icon selected for the user and the body of the message including the received message input, in the display:

the first stored personalized mood icon, comprising an image of the user depicting a respective expression of the user indicated by the user profile picture input is positioned in the display, as the user's profile picture, adjacent to the user's message, and the second stored personalized mood icon, comprising an image of the user depicting a respective expression of the user associated with the particular mood of the user indicated by the received message input of the user, is included in the body of the message including the received message input.

2. The method of claim 1, at least one media item used as one of the personalized mood icons stored in the personalized mood icon library comprising at least one of audio and video.

3. The method of claim 1, at least one media item used as one of the personalized mood icons stored in the personalized mood icon library comprising at least one of image and video.

4. The method of claim 1, the relationship comprising relating user identification information and personalized mood icon identification information, the personalized mood icon identification information comprising a retrieval prompt.

5. The method of claim 1, the identifying further comprising:

detecting a retrieval prompt in the received message input;

retrieving, using the at least one computing device of the messaging system, the personalized mood icon from the personalized mood icon library based on the retrieval prompt detected in the received message input; and including, using the at least one computing device of the messaging system, the retrieved personalized mood icon in the received message input as the second stored personalized mood icon in response to detection of the retrieval prompt, such that inclusion of the second stored personalized mood icon in the message comprising replacing the retrieval prompt with the second stored personalized mood icon in the received message input.

6. The method of claim 5, the retrieving further comprising:

determining that the personalized mood icon does not exist; and causing the identifying, obtaining, using and storing to be performed in response to determining that the personalized mood icon does not exist.

7. The method of claim 1, the method further comprising:

causing a personalized mood icon library user interface to be displayed at a user computing device;

receiving the user's request to create the personalized mood icon; and causing the identifying, obtaining, using and storing to be performed in response to a user request to create the personalized mood icon.

8. The method of claim 1, the obtaining further comprising:

obtaining, using a media item capturing device and a media item capturing user interface, the media item, the media item capturing user interface displaying an outline of the personalized mood icon superimposed over output of the media item capturing device being displayed in the media item capturing user interface.

9. The method of claim 8, the outline comprising an outer boundary of the personalized mood icon providing a positioning guide for the user's face in the media item and two inner outlines providing a positioning guide for the user's eyes in the media item.

10. A messaging system comprising:

at least one computing device, each computing device comprising a processor and a storage medium for tangibly storing thereon program logic for execution by the processor, the stored program logic comprising:

identifying logic executed by the processor for identifying a mood;

obtaining logic executed by the processor for obtaining a media item, at least a portion of the media item comprising an image of the user, the image in the media item depicting a respective expression of a user;

using logic executed by the processor for using at least a portion of the media item comprising an image of the user depicting a respective expression of the user for a personalized mood icon for the user; and storing logic executed by the processor for storing the personalized mood icon and a relationship between the user and the personalized mood icon in a personalized mood icon library comprising a number of personalized mood icons, each stored personalized mood icon, comprising an image of the user depicting a respective expression of the user, is associated with a mood of the user in the personalized mood icon library, each stored personalized mood icon comprising an image of the user depicting a respective expression of the user is retrievable for display as part of a body of the user's message and each stored personalized mood icon comprising an image of the user depicting a respective expression of the user is selectable by the user as the user's profile picture that is to be displayed adjacent to the user's message when the user's message content including text and at least one personalized mood icon is displayed at a recipient user's computing device;

receiving logic executed by the processor for receiving user profile picture input indicating selection of a first stored personalized mood icon, comprising an image of the user depicting a respective expression of the user, by the user, from the personalized mood icon library, to be displayed as the user's profile picture adjacent to each message of the user displayed at the recipient user's computing device;

receiving logic executed by the processor for receiving message input from the user;

selecting logic executed by the processor for selecting, for the user using the received message input, a second stored personalized mood icon from the personalized mood icon library, the second stored personalized mood icon comprising an image of the user depicting a respective expression of the user corresponding to a particular mood of the user determined using the received message input; and causing logic executed by the processor for causing, in response to the received user profile picture input and the received message input, a display at the recipient user's computing device, the display comprising both the first personalized mood icon selected by the user, the second stored personalized mood icon selected for the user and the body of the message including the received message input, in the display:

the first stored personalized mood icon, comprising an image of the user depicting a respective expression of the user indicated by the user profile picture input is position in the display, as the user's profile picture, adjacent to the user's message, and the second stored personalized mood icon, comprising an image of the user depicting a respective expression of the user associated with the particular mood of the user indicated by the received message input of the user, is included in the body of the message including the received message input.

11. The system of claim 10, at least one media item used as one of the personalized mood icons stored in the personalized mood icon library comprising at least one of audio and video.

12. The system of claim 10, at least one media item used as one of the personalized mood icons stored in the personalized mood icon library comprising at least one of image and video.

13. The system of claim 10, the relationship comprising relating user identification information and personalized mood icon identification information, the personalized mood icon identification information comprising a retrieval prompt.

14. The system of claim 10, the identifying logic further comprising:

retrieving logic executed by the processor for retrieving the personalized mood icon from the personalized mood icon library based on the retrieval prompt detected in the received message input; and including logic executed by the processor for including the retrieved personalized mood icon in the received message input as the second stored personalized mood icon in response to detection of the retrieval prompt, such that inclusion of the second stored personalized mood icon in the message comprising replacing the retrieval prompt with the second stored personalized mood icon in the received message input.

15. The system of claim 14, the retrieving logic to retrieve further comprising:

determining logic executed by the processor for determining that the personalized mood icon does not exist; and causing logic executed by the processor for causing the identifying, obtaining, using and storing to be performed in response to determining that the personalized mood icon does not exist.

16. The system of claim 10, the stored program logic further comprising:

causing logic executed by the processor for causing a personalized mood icon library user interface to be displayed at a user computing device;

receiving logic executed by the processor for receiving the user's request to create the personalized mood icon; and causing logic executed by the processor for causing the identifying, obtaining, using and storing to be performed in response to a user request to create the personalized mood icon.

17. The system of claim 10, the obtaining logic for obtaining further comprising:

obtaining logic executed by the processor for obtaining, using a media item capturing device and a media item capturing user interface, the media item, the media item capturing user interface displaying an outline of the personalized mood icon superimposed over output of the media item capturing device being displayed in the media item capturing user interface.

18. The system of claim 17, the outline comprising an outer boundary of the personalized mood icon providing a positioning guide for the user's face in the media item and two inner outlines providing a positioning guide for the user's eyes in the media item.

19. A computer readable non-transitory storage medium for tangibly storing thereon computer readable instructions that when executed by a computing device of a messaging system, perform a method comprising:

identifying a mood;

obtaining a media item, at least a portion of the media item comprising an image of the user, the image in the media item depicting a respective expression of a user;

using at least a portion of the media item comprising an image of the user depicting a respective expression of the user for a personalized mood icon for the user; and storing the personalized mood icon and a relationship between the user and the personalized mood icon in a personalized mood icon library comprising a number of personalized mood icons, each stored personalized mood icon, comprising an image of the user depicting a respective expression of the user, is associated with a mood of the user in the personalized mood icon library, each stored personalized mood icon comprising an image of the user depicting a respective expression of the user is retrievable for display as part of a body of the user's message and each stored personalized mood icon comprising an image of the user depicting a respective expression of the user is selectable by the user as the user's profile picture that is to be displayed adjacent to the user's message when the user's message content including text and at least one personalized mood icon is displayed at a recipient user's computing device;

receiving user profile picture input indicating selection of a first stored personalized mood icon, comprising an image of the user depicting a respective expression of the user, by the user, from the personalized mood icon library, to be displayed as the user's profile picture adjacent to each message of the user displayed at the recipient user's computing device;

receiving message input from the user;

using the received message input in selecting, for the user, a second stored personalized mood icon from the personalized mood icon library, the second stored personalized mood icon comprising an image of the user depicting a respective expression of the user corresponding to a particular mood of the user determined using the received message input; and causing, in response to the received user profile picture input and the received message input, a display at the recipient user's computing device, the display comprising both the first personalized mood icon selected by the user, the second stored personalized mood icon selected for the user and the body of the message including the received message input, in the display:

the first stored personalized mood icon, comprising an image of the user depicting a respective expression of the user indicated by the user profile picture input is position in the display, as the user's profile picture, adjacent to the user's message, and the second stored personalized mood icon, comprising an image of the user depicting a respective expression of the user associated with the particular mood of the user indicated by the received message input of the user, is included in the body of the message including the received message input.

20. The computer readable non-transitory storage medium of claim 19, at least one media item used as one of the personalized mood icons stored in the personalized mood icon library comprising at least one of audio and video.

21. The computer readable non-transitory storage medium of claim 19, at least one media item used as one of the personalized mood icons stored in the personalized mood icon library comprising at least one of image and video.

22. The computer readable non-transitory storage medium of claim 19, the relationship comprising relating user identification information and personalized mood icon identification information, the personalized mood icon identification information comprising a retrieval prompt.

23. The computer readable non-transitory storage medium of claim 19, the method further comprising:

retrieving the personalized mood icon from the personalized mood icon library based on the retrieval prompt detected in the received message input; and including the retrieved personalized mood icon in the received message input as the second stored personalized mood icon in response to detection of the retrieval prompt, such that inclusion of the second stored personalized mood icon in the message comprising replacing the retrieval prompt with the second stored personalized mood icon in the received message input.

24. The computer readable non-transitory storage medium of claim 23, retrieving further comprising:

determining that the personalized mood icon does not exist; and causing the identifying, obtaining, using and storing to be performed in response to determining that the personalized mood icon does not exist.

25. The computer readable non-transitory storage medium of claim 19, the method further comprising:

causing a personalized mood icon library user interface to be displayed at a user computing device;

receiving the user's request to create the personalized mood icon; and causing the identifying, obtaining, using and storing to be performed in response to a user request to create the personalized mood icon.

26. The computer readable non-transitory storage medium of claim 19, the obtaining further comprising:

obtaining, using a media item capturing device and a media item capturing user interface, the media item, the media item capturing user interface displaying an outline of the personalized mood icon superimposed over output of the media item capturing device being displayed in the media item capturing user interface.

27. The computer readable non-transitory storage medium of claim 26, the outline comprising an outer boundary of the personalized mood icon providing a positioning guide for the user's face in the media item and two inner outlines providing a positioning guide for the user's eyes in the media item.

* * * * *